US009608495B2

(12) United States Patent
Timonen (10) Patent No.: US 9,608,495 B2
(45) Date of Patent: Mar. 28, 2017

(54) INTEGRATED EBIKE MOTOR AND BATTERY ASSEMBLY (71) Applicant: GM Global Technology Operations LLC, Detroit, MI (US)

(72) Inventor: Jussi A. Timonen, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 59 days.

(21) Appl. No.: 14/164,577

(22) Filed: Jan. 27, 2014

(65) Prior Publication Data
US 2015/0214813 A1 Jul. 30, 2015

(51) Int. Cl.
*B62M 6/55* (2010.01)
*B62M 11/00* (2006.01)
*H02K 7/00* (2006.01)
*B62M 11/14* (2006.01)
B60K 1/04 (2006.01)
H02K 5/04 (2006.01)
H02K 7/116 (2006.01)
H02K 11/00 (2016.01)

(52) U.S. Cl.
CPC ............ *H02K 7/006* (2013.01); *B62M 6/55* (2013.01); *B62M 11/00* (2013.01); *B62M 11/145* (2013.01); *B60K 2001/0461* (2013.01); *H02K 5/04* (2013.01); *H02K 7/116* (2013.01); *H02K 11/0094* (2013.01)

(58) Field of Classification Search
CPC . B62M 6/40; B62M 6/55; B62M 6/60; B62M 6/65; B62M 11/00; B62M 17/00; B60K 2001/04; B60K 2001/0405; B60K 2001/0455; B60K 2001/0461
See application file for complete search history.

(56) References Cited

U.S. PATENT DOCUMENTS

| 3,533,484 | A  | * | 10/1970 | Wood, Jr. ............... 180/206.4 |
| 3,884,317 | A  | * | 5/1975  | Kinzel ...................... 180/220 |
| 6,196,347 | B1 | * | 3/2001  | Chao et al. ............. 180/206.2 |
| 6,802,385 | B2 | * | 10/2004 | Pyntikov et al. .......... 180/220 |
| 6,927,524 | B2 | * | 8/2005  | Pyntikov et al. ....... 310/254.1 |
| 7,370,720 | B2 | * | 5/2008  | Kokatsu et al. ........ 180/206.4 |
| 7,861,599 | B2 | * | 1/2011  | Meggiolan ............ G01L 3/108 73/760 |
| 8,794,368 | B2 | * | 8/2014  | Gu et al. ................. 180/206.4 |

(Continued)

FOREIGN PATENT DOCUMENTS

CN 201651228 U 11/2010
CN 202094754 U 12/2011
(Continued)

OTHER PUBLICATIONS

Chinese Office Action dated Sep. 26, 2016; Application No. 201510040175.X, Applicant: GM Global Technology Operations LLC.; 9 pages.

*Primary Examiner* — Joseph Rocca
*Assistant Examiner* — Maurice Williams
(74) *Attorney, Agent, or Firm* — BrooksGroup (57) ABSTRACT One variation may include a product comprising: an integrated electric bicycle motor comprising: an inrunner ring motor, a rotor mount coupled to the inside of the inrunner ring motor, and at least one battery assembly coupled to the rotor mount.

20 Claims, 7 Drawing Sheets (56) References Cited

U.S. PATENT DOCUMENTS

| | | | |
|---|---|---|---|
| 8,919,478 B2* | 12/2014 | Gao ........................ | 180/206.4 |
| 2006/0090943 A1* | 5/2006 | Perng ....................... | 180/205 |
| 2011/0133542 A1* | 6/2011 | Ratti et al. ................ | 301/6.5 |
| 2011/0183805 A1* | 7/2011 | Chan ........................ | 475/254 |
| 2011/0303474 A1* | 12/2011 | Kimmich et al. ........ | 180/206.3 |
| 2013/0075176 A1* | 3/2013 | Chan ........................ | 180/206.4 |
| 2013/0233091 A1* | 9/2013 | Tetsuka ................ | B62M 3/003 |
| | | | 73/862.621 |
| 2013/0233092 A1* | 9/2013 | Tetsuka ................ | B62M 3/16 |
| | | | 73/862.621 |
| 2013/0319781 A1* | 12/2013 | Carolin ................ | B62M 6/75 |
| | | | 180/206.8 |
| 2014/0083245 A1* | 3/2014 | Yeh ..................... | F16H 49/001 |
| | | | 74/640 |
| 2015/0251725 A1* | 9/2015 | Rockwood ............. | B62M 9/08 |
| | | | 474/56 |

FOREIGN PATENT DOCUMENTS

| | | |
|---|---|---|
| CN | 102951247 A | 3/2013 |
| CN | 103303426 A | 9/2013 |
| FR | 2264676 A1 | 10/1975 |

\* cited by examiner

INTEGRATED EBIKE MOTOR AND BATTERY ASSEMBLY

TECHNICAL FIELD

The field to which the disclosure generally relates to includes electric bicycles.

BACKGROUND

An electric bicycle may include a motor and a battery assembly.

SUMMARY OF ILLUSTRATIVE VARIATIONS

One variation may include a product comprising: an integrated electric bicycle motor comprising an in runner ring motor comprising a stator and a rotor, and wherein the rotor is moveably coupled to the stator; a rotor mount constructed and arranged to hold the rotor in position and wherein the rotor is constructed and arranged to rotate around the rotor mount; wherein the rotor mount is constructed and arranged to accommodate a bottom bracket; and at least one battery assembly coupled to the rotor mount.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
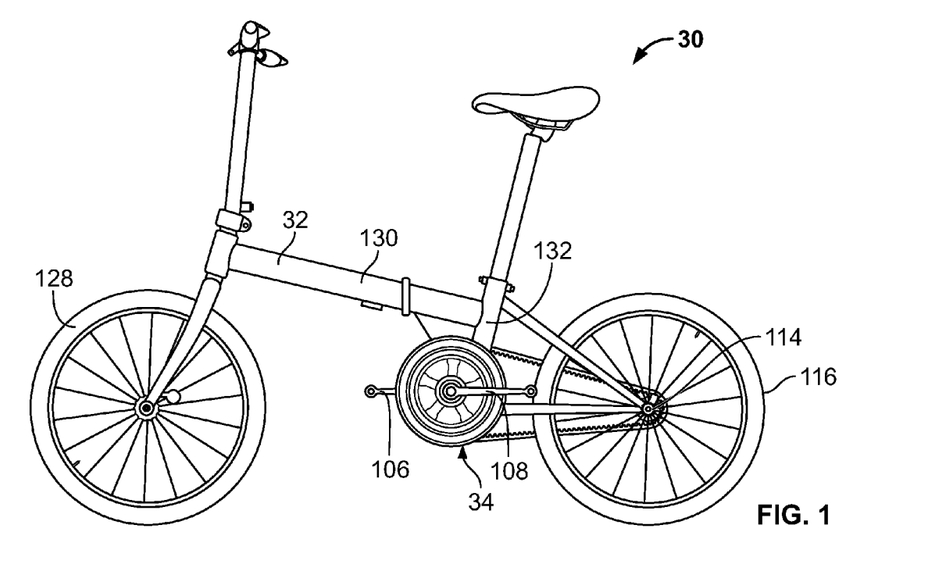
FIG. 1 illustrates a side view of an electric bicycle according to a number of variations.
Figure 2:
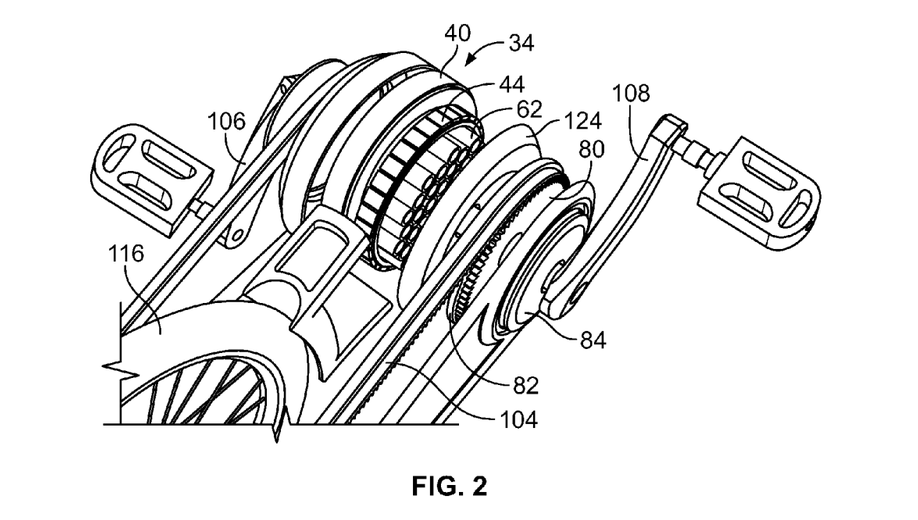
FIG. 2 illustrates an exploded prospective view of an electric bicycle power train according to a number of variations.
Figure 3:
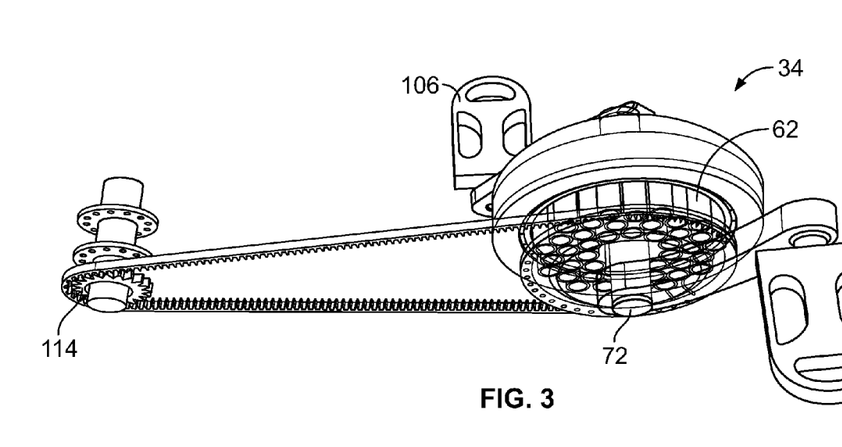
FIG. 3 illustrates a prospective view of an electric bicycle power train according to a number of variations.

Referring to FIGS. 1-3, in any of a number of variations, an electric bike or Ebike 30 may include an electric motor 34 which may be used to propel the electric bicycle 30 forward. In any of a number of variations, an electric bicycle's 30 electric motor 34 may be powered by any of a number of types of battery assemblies 62, for example as illustrated in FIG. 2.

In any of a number of variations, a motor 34 may be attached to an electric bicycle 30 adjacent the pedal assemblies 106, 108, chain ring 80 (or belt ring), and/or bottom bracket 72. The placement of the motor 34 in this area may provide additional packaging space in the motor 34 so that the motor 34 may be integrated with additional powertrain components including, but not limited to, one or more batteries assemblies 62, internal hub gears 110 (best illustrated in FIG. 12), overdrive gears 112 (best illustrated in FIG. 12), a bicycle roller-based continuously variable transmission (CVT) 118 (best illustrated in FIG. 14), and/or the motor control electronics 150 (best illustrated in FIG. 20) as will be discussed hereafter. The integrated motor 34 may increase the structural integrity and efficiency of the electric bicycle 30, and/or may reduce the weight of the electric bicycle 30.

Figure 4:
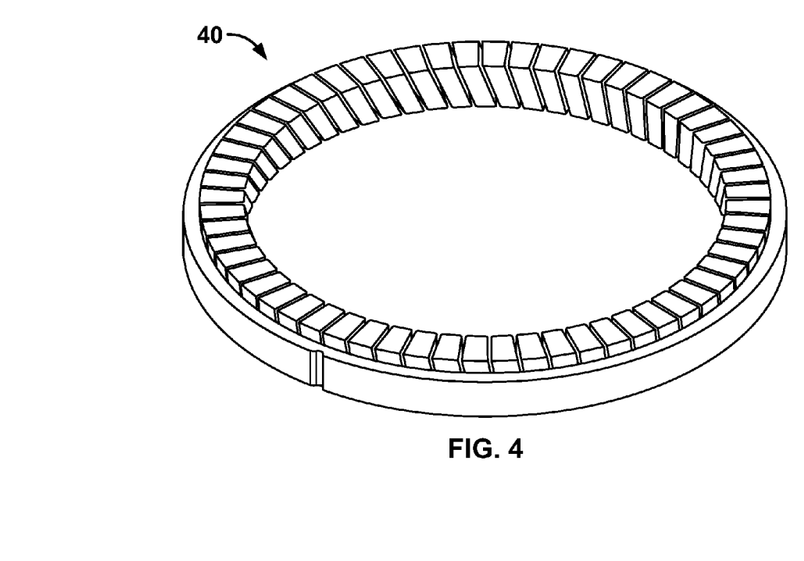
FIG. 4 illustrates a prospective view of a stator according to a number of variations.
Figure 5:
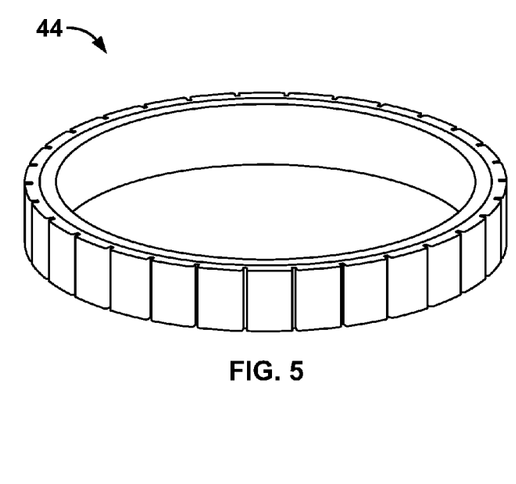
FIG. 5 illustrates a prospective view of a rotor according to a number of variations.
Figure 6:
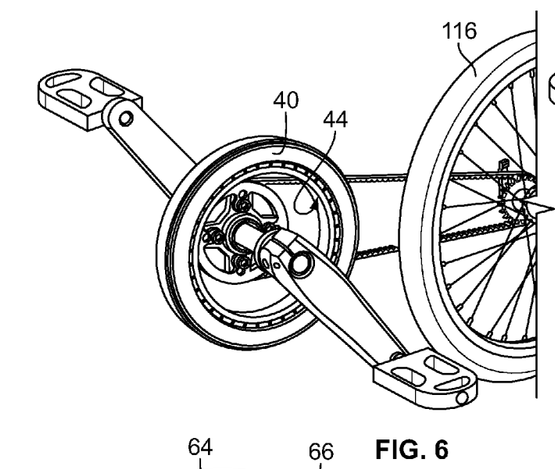
FIG. 6 illustrates a prospective view of several electric bicycle power train components according to a number of variations.
Figure 7:
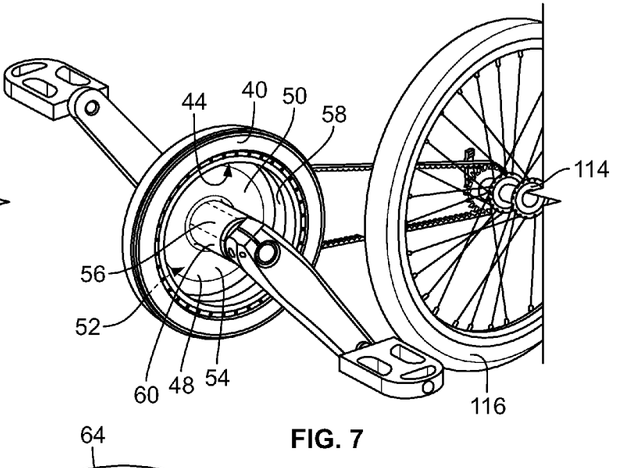
FIG. 7 illustrates a prospective view of several electric bicycle power train components according to a number of variations.

Referring to FIGS. 2-6, an integrated motor 34 may include any of a number of types of motors including, but not limited to, a brushless inrunner ring motor 34. In any of a number of variations, a brushless inrunner ring motor 34 may comprise a stator 40 and a rotor 44. The stator 40 may be ring shaped and may be stationary and may include an electromagnet, for example as illustrated in FIG. 4. The rotor 44, in any of a number of variations, may be ring shaped and may include one or more permanent magnets, for example as illustrated in FIG. 5, which may rotate or spin with the rotor 44. The rotor 44 may be constructed and arranged to float inside of the stator 40, for example as illustrated in FIG. 6. An electronic speed controller (ESC) 150, (best illustrated in FIG. 20), may be used to vary the speed, direction, and/or braking of the inrunner ring motor 34. In a number of variations, the ESC may switch the polarity of each pole, each time a magnet on the rotor 44 passes the pole on the stator 40. When the polarity is switched, the magnet is attracted to the next pole and may repel the last pole which it passed. This may cause the rotor 44 to rotate within the stator 40. This process is repeated for the duration that power is supplied to the inrunner motor 34 which may drive the motor. Referring to FIG. 7, in any of a number of variations, a rotor mount 48 may be placed inside of the rotor 44 and may be used to hold the rotor 44 in position and to couple it to the bottom bracket 72. The rotor mount 48 may be stationary while the rotor 44 may rotate around the rotor mount 48. The rotor mount 48 may comprise a wall 50, which may include a first surface 52 and a second surface 54 which may be circular in shape, and may include a through-hole 56 which may be located approximately central of the wall 50 and may extend through the first surface 52 and the second surface 54. A first lip 58 may extend a distance from the perimeter of the second surface 54 of the wall 50 approximately the thickness of the rotor 44. A second lip 60 may extend a distance from the perimeter of the through-hole 56 from the second surface 54 of the wall 50 and may be constructed and arranged to house a bottom bracket 72 as will be discussed hereafter. The rotor mount 48 may also be constructed and arranged to accommodate one or more battery cells 64 adjacent the second surface 54 of the rotor mount 48 as will be discussed hereafter. The rotor mount 48 may also be constructed and arranged to provide thermal management for heat sensitive rotor magnets for example, but not limited to, one or more thermal fins or surfaces which may extend from the rotor mount 48 to the rotor 44 to increase the rate of heat transfer to the bicycle frame 32 by increasing convection.

Figure 8:
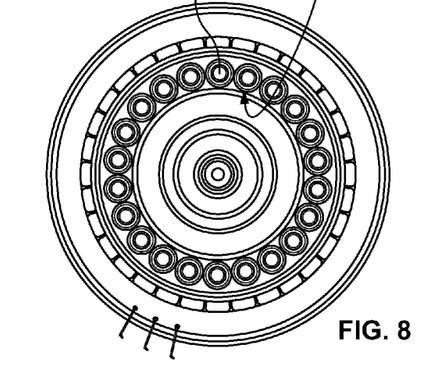
FIG. 8 illustrates a side view of an integrated motor according to a number of variations.
Figure 9:
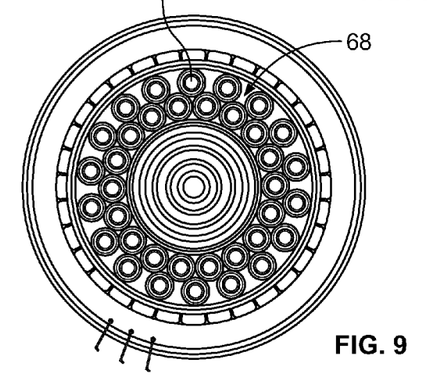
FIG. 9 illustrates a side view of an integrated motor according to a number of variations.
Figures 10, 11, 12:
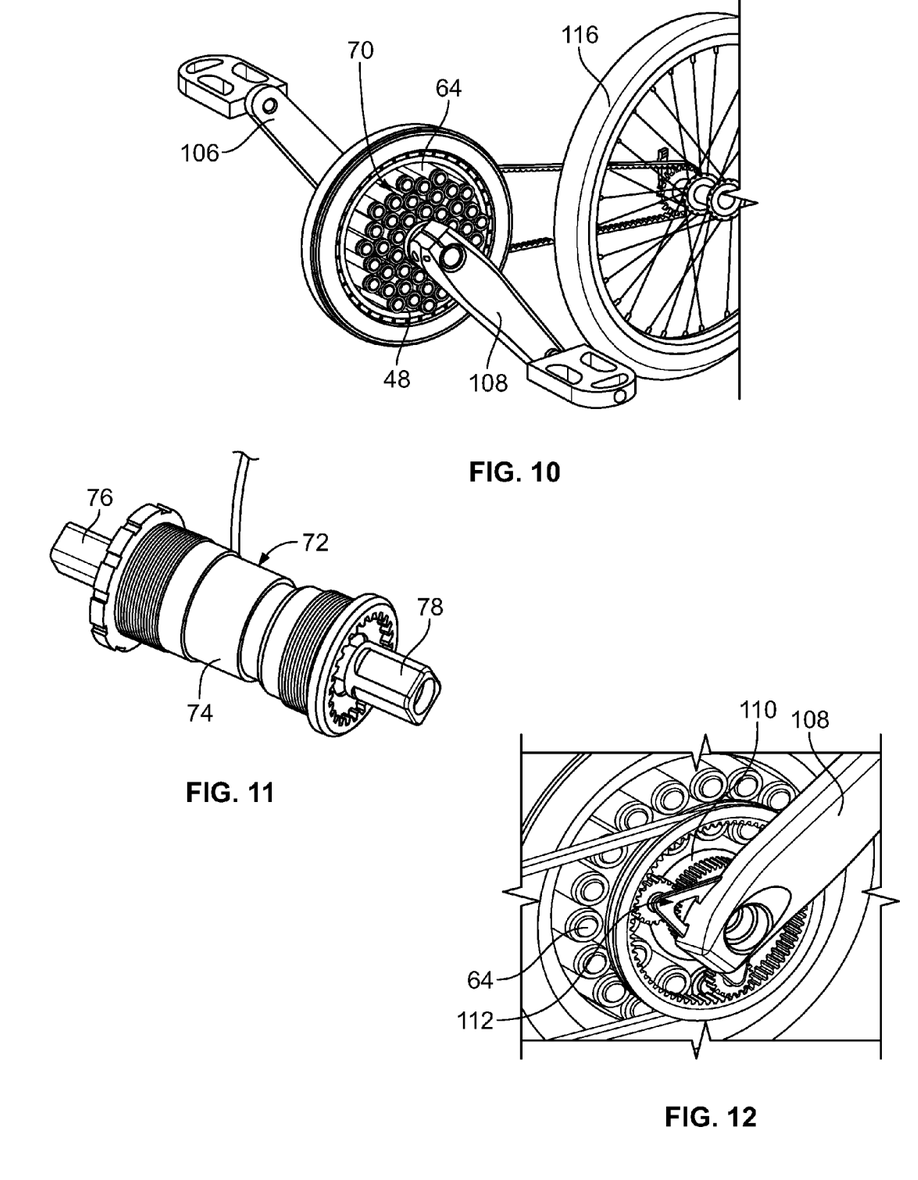
FIG. 10 illustrates a prospective view of an electric bicycle power train according to a number of variations.
FIG. 11 illustrates a prospective view of a bottom bracket according to a number of variations.
FIG. 12 illustrates a prospective view of an integrated motor with internal hub gearing and overdrive gearing according to a number of variations.

Referring to FIGS. 8-10, in any of a number of variations, one or more battery cells 64 may be placed in the rotor mount 48 adjacent the second surface 54. The one or more battery cells 64 may be arranged in any of a number of configurations including, but not limited to, a single row forming a circle 66, for example as illustrated in FIG. 8, a double row each forming a circle 68, for example as illustrated in FIG. 9, or numerous rows of batteries which may form any of a number of patterns 70, for example as illustrated in FIG. 10.

Referring to FIGS. 2-3, in any of a number of variations, a chain ring 80 (or belt ring) may be adjacent the rotor 44 and may be separated from the rotor 44 by an interface component 82. In any of a number of variations, a chain ring 80 (or belt ring) may drive a chain 104 (or a belt) which may drive a rear wheel 116.

In any of a number of variations, a front freewheel 84 may be mounted to the chain ring 80 (or belt ring), for example as illustrated in FIG. 2. The front freewheel 84 may be constructed and arranged to separate the second pedal assembly 108 from the motor input which may prevent the first and second pedal assemblies 106, 108 from turning unless a rider chooses to manually turn them. In another variation, a one way clutch or one way bearing may be used to separate the motor input from the pedal input. The front freewheel 84, the clutch or bearing may also allow for regenerative breaking.

Figure 19:
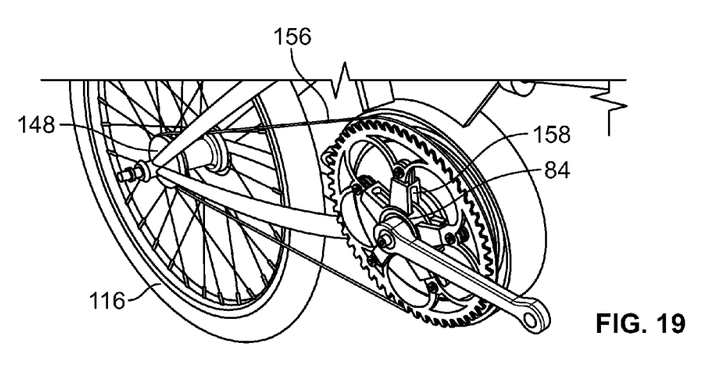
FIG. 19 illustrates a prospective view of a bicycle power train according to a number of variations.
Figures 20, 21, 22:
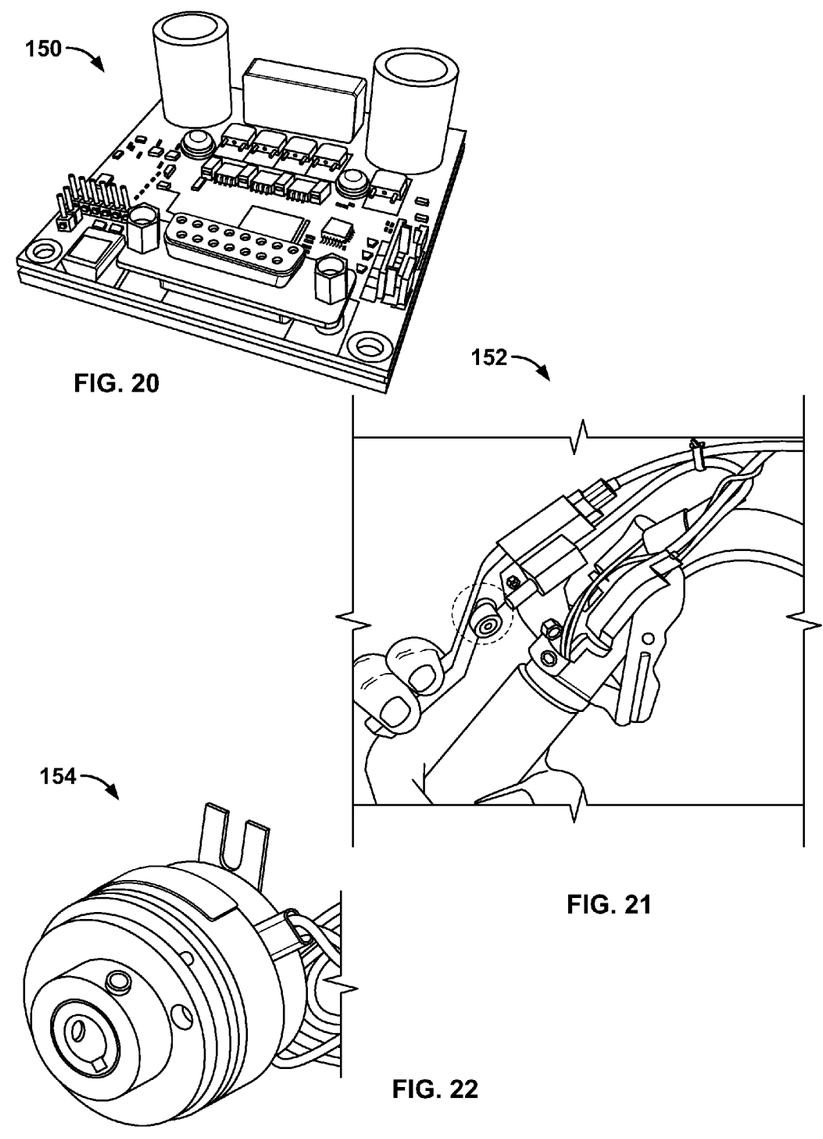
FIG. 20 illustrates a motor controller according to a number of variations.
FIG. 21 illustrates a break lever according to a number of variations.
FIG. 22 illustrates an electromagnetic clutch according to a number of variations.

Referring to FIGS. 19-22, in any of a number of variations, the rear wheel 116 rear sprocket or hub 114 may also include a freewheel 148 in a traditional bicycle freewheel rear hub configuration. In another variation, the rear wheel 116 may include a fixed rear sprocket 114. In this variation, when the rider is not pedaling, the electric bicycle 30 may freewheel only when the motor 38 is turning. The electric speed controller 150, for example as illustrated in FIG. 20, may help to reduce resistance by keeping the motor slightly powered or may freewheel with resistance or may go into a breaking mode if a break lever 152, for example, but not limited to, a magnetic switch break, as illustrated in FIG. 21, is applied (regeneration).

In another variation, an electro mechanical clutch 154, for example as illustrated in FIG. 22, may be attached to a rear sprocket 114 which may allow traditional freewheeling. In this variation, a break 152, for example, but not limited to, a magnetic switch break as illustrated in FIG. 21, may be applied which may engage a clutch 158 from freewheeling which may turn a belt 156 (or chain) and the motor 38, for example as illustrated in FIG. 19. The motor 38 may then regenerate when the clutch 158 is engaged and may freewheel when the clutch 158 is disengaged.

In another variation, the pedal assemblies 106, 108 and the motor 38 may be separated from the chain ring (or belt ring) 80 with separate freewheels 148 or electro mechanical clutches 154.

Referring to FIGS. 2-3 and 11, in any of a number of variations, a bottom bracket 72 may extend through the through-hole 56 and the second lip 60 of the rotor mount 48. The bottom bracket 72 may comprise a body 74, a first shaft 76, and a second shaft 78, for example as illustrated in FIG. 11. The body 74 may be cylindrical in shape and may include one or more torque sensors. The first shaft 76 may be constructed and arranged to attach to a first pedal assembly 106 and the second shaft 78 may be constructed and arranged to attached to a front freewheel 84 and a second pedal assembly 108. In any of a number of variations, the bottom bracket 72 may be constructed and arranged so that it may be accessed without the need to remove the front wheel 128 (best illustrated in FIG. 2) or the rear wheel 116.

Figures 13, 14, 15, 16:
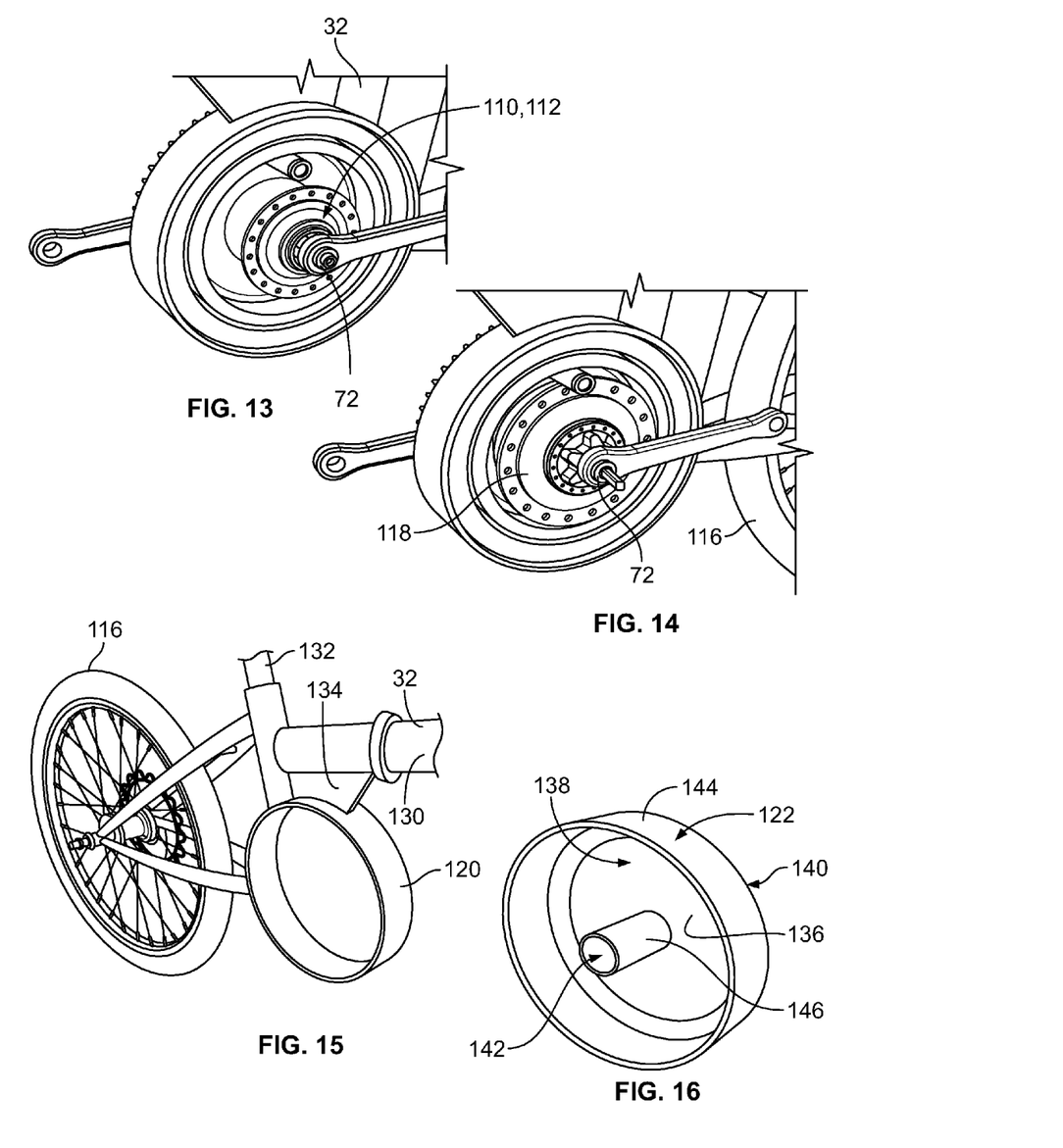
FIG. 13 illustrates a prospective view of an integrated motor with internal hub gearing according to a number of variations.
FIG. 14 illustrates a prospective view of an integrated motor with a roller based continuously variable transmission according to a number of variations.
FIG. 15 illustrates a prospective view of a motor housing according to a number of variations.
FIG. 16 illustrates a prospective view of a motor housing according to a number of variations.

Referring to FIGS. 12-14, in any of a number of variations, internal hub gearing 110 and overdrive gearing 112 may comprise a single unit which may be placed within the integrated motor 34. In any of a number of variations, the internal hub gears 110 may be attached to the bottom bracket 72. The rider may manually pedal which may cause a torque output from the gears 110, 112 to travel directly to the front chain ring 80 separate from the motor 38 output which may increase the speed of the riders torque output and may allow the motor 38 to match it as the rider torque output may only travel through the internal hub gears 110 rather than the motor's 38 torque output. The motor output may include a ratio of approximately 1:1 from the front chain ring 80 to the rear sprocket 114 (best illustrated in FIG. 2) which may allow the motor 38 to run on higher revolutions per minute (rpm), for example, but not limited to, 400 rpm while the riders cadence may be at 60 rpm. In another variation, a CVT hub gear box 118 may be attached to the bottom bracket 72, for example as illustrated in FIG. 14.

Referring to FIGS. 1, 2, and 15-18, in any of a number of variations, an integrated motor 34 may be attached to the bicycle frame 32. In one variation, the stator 40 may be attached directly to the bicycle frame 32 adjacent the top tube 130 and the seat tube 132, for example as illustrated in FIG. 1. The stator 40 may be attached to the electric bicycle frame 32 in any of a number of variations including, but not limited to, press fitting the stator 40 to the bicycle frame 32, screwing the stator 40 to the bicycle frame 32, bonding the stator 40 to the bicycle frame with any of a number of variations of heat transfer agents, and/or welding the stator 40 to the bicycle frame 32.

In another variation, a motor housing 120, 122 may be integrated into the bicycle frame 32. In any of a number of variations, the motor housing 120, 122 may be adjacent a top tube 130, a seat tube 132, and/or a reinforcement plate 134 of the bicycle frame 32, for example as illustrated in FIGS. 1, 15, 17 and 18. Any of a number of variations of motor housings 120, 122 may be used including, but not limited to, a ring shaped motor housing 120, for example as illustrated in FIG. 15. The ring shaped motor housing 120 may comprise any of a number of materials including, but not limited to, steel, and may be formed in any of a number of variations including, but not limited to, roll forming. The ring shaped motor housing 120 may also include any of a number of closures or covers 124 including, but not limited to, a circular cover which may be constructed and arranged to cover at least a portion of the stator 40 and the rotor 44, for example as illustrated in FIG. 2.

Figure 17:
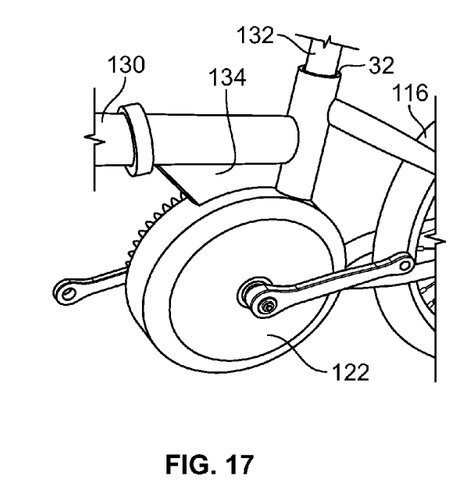
FIG. 17 illustrates a prospective view of a motor housing according to a number of variations.
Figure 18:
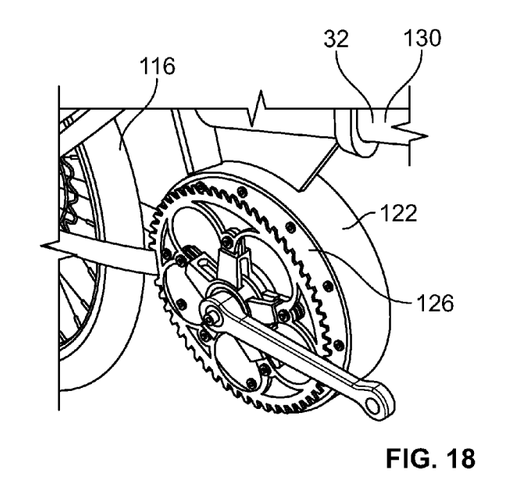
FIG. 18 illustrates a prospective view of an integrated motor according to a number of variations.

In another variation, a motor housing 122 may be cup-like in shape, for example as illustrated in FIGS. 16-18. A cup-like shaped motor housing 122 may comprise a wall 136 which may include a first surface 138 and a second surface 140. A through-hole 142 may extend through the wall 136 approximately central of the wall 136. A first lip 144 may extend from the perimeter of the wall 136 from the first surface 138 and a second lip 146 may extend from the perimeter of the through-hole 142 from the first surface 138. The cup-like shaped motor housing 122 may comprise any of a number of materials including, but not limited to, steel, and may be formed in any of a number of ways including, but not limited to, metal forming or deep drawing. The cup-like shaped motor housing 122 may also include any of a number of covers or closures 126 including, but not limited to, a plate 126 which is substantially planar with a bearing interface, for example as illustrated in FIG. 18.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: an integrated electric bicycle motor comprising: an inrunner ring motor comprising a stator and a rotor, and wherein the rotor is moveably coupled to the stator; a rotor mount constructed and arranged to hold the rotor in position and wherein the rotor is constructed and arranged to rotate around the rotor mount; wherein the rotor mount is constructed and arranged to accommodate a bottom bracket; and at least one battery assembly coupled to the rotor mount.

Variation 2 may include a product as set forth in Variation 1 wherein the inrunner ring motor is a brushless inrunner motor.

Variation 3 may include a product as set forth in any of Variations 1-2 further comprising at least one inrunner ring motor controller which controls at least one of the speed, direction, or braking of the inrunner ring motor.

Variation 4 may include a product as set forth in any of Variations 1-3 wherein the integrated electric bicycle motor further comprises at least one internal hub gear which is located adjacent the rotor mount and the at least one battery assembly and which is constructed and arranged to be coupled to a bottom bracket.

Variation 5 may include a product as set forth in any of Variations 1-4 further comprising at least one overdrive gear which is located adjacent the at least one internal hub gear and the at least one battery assembly and which is constructed and arranged to be coupled to a bottom bracket.

Variation 6 may include a product as set forth in any of Variations 1-3 further comprising a roller based continuously variable transmission adjacent the rotor mount and the at least one battery assembly and which is constructed and arranged to be coupled to a bottom bracket.

Variation 7 may include a product as set forth in any of Variations 1-6 wherein the integrated electric bicycle motor is attached to an electric bicycle.

Variation 8 may include a product as set forth in any of Variations 1-7 wherein the stator is attached to the electric bicycle frame.

Variation 9 may include a product as set forth in any of Variations 1-8 wherein the stator is attached to the electric bicycle frame adjacent a top tube and a seat tube.

Variation 10 may include a product as set forth in any of Variations 1-9 wherein a bottom bracket extends through the integrated electric bicycle motor.

Variation 11 may include a product as set forth in any of Variations 1-10 wherein the bottom bracket is constructed and arranged so that it is accessible without the removal of one or more wheels.

Variation 12 may include a product as set forth in any of Variations 1-11 wherein the bottom bracket includes one or more torque sensors.

Variation 13 may include a product as set forth in any of Variations 1-7 and 10-12 wherein the integrated electric bicycle motor is attached to an electric bicycle motor housing on the electric bicycle.

Variation 14 may include a product as set forth in any of Variations 1-7 and 10-13 wherein the electric bicycle motor housing is integrated into an electric bicycle frame.

Variation 15 may include a product as set forth in any of Variations 1-7 and 10-14 wherein the electric bicycle motor housing is adjacent a top tube and a seat tub of the electric bicycle frame.

Variation 16 may include a product as set forth in any of Variations 1-7 and 10-15 wherein the bicycle motor housing is ring shaped.

Variation 17 may include a product as set forth in any of Variations 1-7 and 10-16 wherein the bicycle motor housing is cup shaped.

Variation 18 may include a product as set forth in any of Variations 1-7 and 10-17 further comprising a bicycle motor housing cover constructed and arranged to cover an inrunner ring motor.

Variation 19 may include a product as set forth in Variation 1 further comprising a bottom bracket which extends through the integrated motor; a first pedal assembly adjacent a first side of the integrated motor; a chain ring adjacent a second side of the integrated motor; a freewheel adjacent the chain ring; and a second pedal assembly adjacent the freewheel.

Variation 20 may include a product as set forth in Variation 19 further comprising a rear sprocket and an electro mechanical clutch attached to the rear sprocket which is constructed and arranged to allow freewheeling or power regeneration.

Variation 21 may include a product as set forth in Variation 1 further comprising a bottom bracket which extends through the integrated motor; a first pedal assembly adjacent a first side of the integrated motor; a belt ring adjacent a second side of the integrated motor; a freewheel adjacent the belt ring; and a second pedal assembly adjacent the freewheel.

Variation 22 may include a product as set forth in Variation 21 further comprising a rear sprocket and an electro mechanical clutch attached to the rear sprocket which is constructed and arranged to allow freewheeling or power regeneration.

Variation 23 may include a product comprising: a rotor mount comprising: a wall having a first surface and a second surface and a through-hole extending therethrough approximately central of the first and the second surface; a first lip extending a distance from the perimeter of the second surface and which is constructed and arranged to hold a rotor in place; a second lip extending a distance from the perimeter of the through-hole and which is constructed and arranged to house a bottom bracket; and wherein the rotor mount is constructed and arranged to accommodate one or more battery assemblies.

Variation 24 may include a product as set forth in any of Variations 1-23 wherein the rotor mount is constructed and arranged to provide thermal management for one or more rotor magnets.

The above description of select variations within the scope of the invention is merely illustrative in nature and, thus, variations or variants thereof are not to be regarded as a departure from the spirit and scope of the invention.

What is claimed is:

1. A product comprising:
   an integrated electric bicycle motor comprising:
   an inrunner ring motor comprising a stator and a rotor, and wherein the rotor is moveably coupled to the stator;
   a rotor mount constructed and arranged to hold the rotor in position and wherein the rotor is constructed and arranged to rotate around the rotor mount;
   wherein the rotor mount is constructed and arranged to accommodate a bottom bracket;
   at least one battery assembly coupled to the rotor mount; and
   at least one internal hub gear which is located adjacent the rotor mount and the at least one battery assembly and which is constructed and arranged to be coupled to a bottom bracket.

2. The product of claim 1 further comprising a rear sprocket and an electro mechanical clutch attached to the rear sprocket which is constructed and arranged to allow freewheeling or power regeneration.

3. The product of claim 1 wherein the inrunner ring motor is a brushless inrunner motor.

4. The product of claim 1 further comprising at least one inrunner ring motor controller which controls at least one of the speed, direction, or braking of the inrunner ring motor.

5. The product of claim 1 wherein the integrated electric bicycle motor is attached to an electric bicycle.

6. The product of claim 5 wherein the integrated electric bicycle motor is attached to an electric bicycle motor housing on the electric bicycle.

7. The product of claim 6 wherein the electric bicycle motor housing is adjacent a top tube and a seat tube of the electric bicycle.

8. The product of claim 6 wherein the bicycle motor housing is ring shaped.

9. The product of claim 6 wherein the bicycle motor housing is cup shaped.

10. The product of claim 6 further comprising a bicycle motor housing cover constructed and arranged to cover the inrunner ring motor.

11. The product of claim 1 wherein the stator is attached to a frame of an electric bicycle.

12. The product of claim 1 further comprising at least one overdrive gear which is located adjacent the at least one internal hub gear and the at least one battery assembly and which is constructed and arranged to be coupled to the bottom bracket.

13. The product of claim 1 wherein the entire rotor rotates within the stator.

14. A product comprising:
    an integrated electric bicycle motor comprising:
    an inrunner ring motor comprising a stator and a rotor, and wherein the rotor is moveably coupled to the stator;
    a rotor mount constructed and arranged to hold the rotor in position and wherein the rotor is constructed and arranged to rotate around the rotor mount;
    wherein the rotor mount is constructed and arranged to accommodate a bottom bracket;
    at least one battery assembly coupled to the rotor mount; and
    a roller based continuously variable transmission adjacent the rotor mount and the at least one battery assembly which is constructed and arranged to be coupled to a bottom bracket.

15. A product as set forth in claim 14 further comprising a rear sprocket and an electro mechanical clutch attached to the rear sprocket which is constructed and arranged to allow freewheeling or power regeneration.

16. The product of claim 14 wherein the inrunner ring motor is a brushless inrunner motor.

17. The product of claim 14 further comprising at least one inrunner ring motor controller which controls at least one of the speed, direction, or braking of the inrunner ring motor.

18. The product of claim 14 wherein the integrated electric bicycle motor is attached to an electric bicycle.

19. The product of claim 18 wherein the stator is attached to a frame of the electric bicycle.

20. The product of claim 18 wherein the integrated electric bicycle motor is attached to an electric bicycle motor housing on the electric bicycle.

* * * * *